US008886156B2

(12) United States Patent
Khouri et al.

(10) Patent No.: US 8,886,156 B2
(45) Date of Patent: Nov. 11, 2014

(54) METHOD AND APPARATUS FOR USING MOBILITY INFORMATION TO SELECT PROFILES IN NETWORK SYSTEMS (75) Inventors: Joseph F. Khouri, San Jose, CA (US); Alan D. Gatzke, Bainbridge Island, WA (US); Laurent Philonenko, San Francisco, CA (US); Mukul Jain, San Jose, CA (US); Sanjeev Kumar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1221 days.

(21) Appl. No.: 12/535,838

(22) Filed: Aug. 5, 2009

(65) Prior Publication Data

US 2011/0034152 A1 Feb. 10, 2011

(51) Int. Cl.
*H04M 11/04* (2006.01)
*H04M 3/533* (2006.01)
*H04W 4/02* (2009.01)
*H04M 3/523* (2006.01)
*H04W 4/00* (2009.01)
*H04W 88/06* (2009.01)
*H04W 64/00* (2009.01)
*H04L 29/08* (2006.01)

(52) U.S. Cl.
CPC ............ *H04M 3/5235* (2013.01); *H04W 88/06* (2013.01); *H04M 3/53333* (2013.01); *H04W 64/006* (2013.01); *H04W 4/02* (2013.01); *H04W 4/028* (2013.01); *H04M 2203/4536* (2013.01); *H04W 4/027* (2013.01); *H04W 4/001* (2013.01); *H04L 67/306* (2013.01); *H04M 2242/30* (2013.01)
USPC .............. 455/404.2; 379/265.11; 379/266.01; 340/426.19; 340/426.2; 340/539.13

(58) Field of Classification Search
USPC ........ 455/404.2, 407, 408, 412.2, 413, 414.1, 455/422.1, 425, 456.1, 456.5, 456.6, 457, 455/463, 466; 379/265.05, 265.09, 265.1, 379/265.11, 265.13, 266.01, 266.02; 701/201, 213; 340/426.19, 426.2, 340/539.13
See application file for complete search history.

(56) References Cited

U.S. PATENT DOCUMENTS

| 6,320,534 | B1 | 11/2001 | Goss |
| 6,434,479 | B1 * | 8/2002 | Kondou et al. ............... 701/203 |
| 6,711,474 | B1 * | 3/2004 | Treyz et al. ........................ 701/1 |
| 6,795,017 | B1 * | 9/2004 | Puranik et al. ............ 342/357.77 |
| 7,043,255 | B1 * | 5/2006 | Tiwari ......................... 455/456.1 |
| 7,139,551 | B2 * | 11/2006 | Jamadagni ................. 455/412.1 |
| 7,162,237 | B1 | 1/2007 | Silver et al. |
| 7,499,700 | B2 * | 3/2009 | Dillon et al. .................. 455/423 |
| 7,734,315 | B2 * | 6/2010 | Rathus et al. .............. 455/569.2 |
| 7,983,661 | B2 * | 7/2011 | Purontaus et al. ............. 455/417 |
| 2002/0122402 | A1 * | 9/2002 | Periyalwar et al. ........... 370/342 |
| 2002/0122403 | A1 * | 9/2002 | Hashem et al. ............... 370/342 |
| 2003/0083066 | A1 * | 5/2003 | Shin et al. ..................... 455/433 |

(Continued)

*Primary Examiner* — San Htun
*Assistant Examiner* — Gerald Oliver
(74) *Attorney, Agent, or Firm* — P. Su (57) ABSTRACT In one embodiment, a method includes obtaining mobility information associated with a remote device. The mobility information indicates whether the remote device is approximately stationary. The remote device interacts with a server. The method also includes determining if the mobility information indicates that the remote device is approximately stationary, and selecting a first profile of a plurality of profiles if the remote device is approximately stationary. If the remote device is not approximately stationary, a second profiled of the plurality of profiles is selected.

26 Claims, 6 Drawing Sheets

(56) References Cited

U.S. PATENT DOCUMENTS

| | | | |
|---|---|---|---|
| 2004/0176083 A1* | 9/2004 | Shiao et al. | 455/417 |
| 2005/0215241 A1* | 9/2005 | Okada | 455/414.1 |
| 2007/0173266 A1* | 7/2007 | Barnes | 455/456.1 |
| 2008/0233945 A1* | 9/2008 | Gummadi et al. | 455/422.1 |
| 2009/0221279 A1* | 9/2009 | Rutledge | 455/418 |
| 2009/0253455 A1* | 10/2009 | Huang | 455/550.1 |
| 2009/0312038 A1* | 12/2009 | Gildea | 455/456.4 |
| 2010/0291951 A1* | 11/2010 | Wahlander et al. | 455/456.6 |

* cited by examiner

METHOD AND APPARATUS FOR USING MOBILITY INFORMATION TO SELECT PROFILES IN NETWORK SYSTEMS

FIELD OF TECHNOLOGY

The present invention relates generally to networks.

BACKGROUND

A contact center, e.g., a customer interaction center, is an entity that generally manages customer contacts. Contact centers typically include call centers which are arranged to process customer calls or requests. Call centers route incoming customer calls to appropriate agents such that the agents may provide service or otherwise process the customer calls.

Contact centers are making increased use of mobile agents who use mobile devices such as cellular phones, personal digital assistants (PDAs), laptop or notebook computers, and the like. While traditional agents of contact centers are generally stationary, e.g., located at a substantially fixed physical location, and use desktop phones and/or computers, mobile agents are often moving around.

Like agents or a contact center, subscribers to voicemail services may often be mobile. Mobile subscribers may access, and interact with, their voicemail boxes using mobile devices such as cellular phones, PDAs, laptop or notebook computers, and the like.

BRIEF DESCRIPTION OF THE DRAWINGS

The embodiments will be readily understood by the following detailed description in conjunction with the accompanying drawings, wherein like reference numerals designate like structural elements, and in which.

DESCRIPTION OF EXAMPLE EMBODIMENTS

General Overview

According to one aspect, a method includes obtaining mobility information associated with a remote device. The mobility information indicates whether the remote device is approximately stationary. The remote device interacts with a server. The method also includes determining if the mobility information indicates that the remote device is approximately stationary, and selecting a first profile of a plurality of profiles if the remote device is approximately stationary. If the remote device is not approximately stationary, a second profiled of the plurality of profiles is selected.

Description

Mobile or portable devices often include technology that allows the motion of such devices, e.g., the speed at which such devices are moving, to be detected. The location of, as well as the speed of, mobile devices may be tracked using technologies that include, but are not limited to including, global positioning system (GPS) technologies, triangulation technologies, and accelerometer technologies.

The motion of a mobile agent of a contact center may be detected through the use of technology included in mobile devices in possession of the mobile agent. When the contact center obtains information relating to the motion of the mobile agent, the contact center may determine whether to route a call to the mobile agent, or assign a routing priority to the contact center. In other words, information relating to whether a mobile agent is moving may be used by a contact center as a factor in assessing whether to route a call to the mobile agent. For example, if a mobile agent is currently moving, a contact center may decide to effectively bypass the mobile agent and route a call to a stationary agent rather than the mobile agent. Alternatively, if a mobile agent is currently moving, a contact center may prioritize the mobile agent with respect to a pool of agents suitable for servicing a particular call based upon the speed at which the mobile agent is moving. As mobile agents who are moving are often less likely to provide satisfactory service than mobile agents who are not moving, the ability to determine whether a mobile agent is moving before a call is routed to the mobile agent may increase caller satisfaction for callers into a contact center.

Motion information associated with a voicemail subscriber may also be used with respect to voicemail systems, as for example to provide voicemail options to the voicemail subscriber. When a voicemail system obtains information relating to the motion of a subscriber, the voicemail system may present options for accessing a voicemail box to the subscriber. For example, a voice-driven interface to access a voicemail box may be substantially automatically provided to a subscriber if the voicemail system determines that the subscriber is in motion, whereas an option of either a voice-driven interface or a key press interface may be provided to the subscriber if the voicemail system determines that the subscriber is not in motion. Substantially automatically providing a subscriber with suitable options based upon mobility may increase the level of satisfaction experienced by the subscriber, as the need to navigate through different menus to specify options may be reduced.

Some voicemail systems, particularly those associated with unified messaging systems, provide a text-to-speech (TTS) conversion feature which allows a subscriber to have emails converted into speech such that the subscriber may then listen to his or her email being read out. Many subscribers would prefer to read emails, rather than listen to emails being read out, whenever possible. As such, in one embodiment, a subscriber who is currently moving may have a TTS conversion feature substantially automatically offered or provided, whereas a subscriber who is currently stationary may have an option to select a TTS conversion feature, but may not have the TTS conversion feature substantially automatically offered or provided.

In one embodiment, contact centers utilize mobility information, e.g., the speeds of physical movement associated with mobile agents of the contact centers, to effectively select suitable mobile agents for handling particular calls. That is, contact centers may use mobility information to select suitable mobile agents to handle calls from callers into the call centers. In another embodiment, voicemail features such as voice recognition, voice-driven interfaces, and the TTS playback of email are substantially automatically enable or disabled depending on mobility information provided by a subscriber to a voicemail system.

Herein and after, for ease of discussion, a mobile agent will generally be described as being in possession, or otherwise associated with, a device that may be used to provide service on behalf of a call or contact center system. That is, a mobile agent will be described as including a user and a mobile device. For example, a mobile agent may include a human agent and a device used by, or otherwise in the possession of, the human agent for purposes of communicating with a caller who has requested service from a call or contact center system. Similarly, a subscriber will generally be described as including a device that is associated with a user who utilizes services provided by a voicemail server. By way of example, a subscriber may include a user and a cellular phone or computing system that the user uses to check his or her voicemail.

Figure 1:
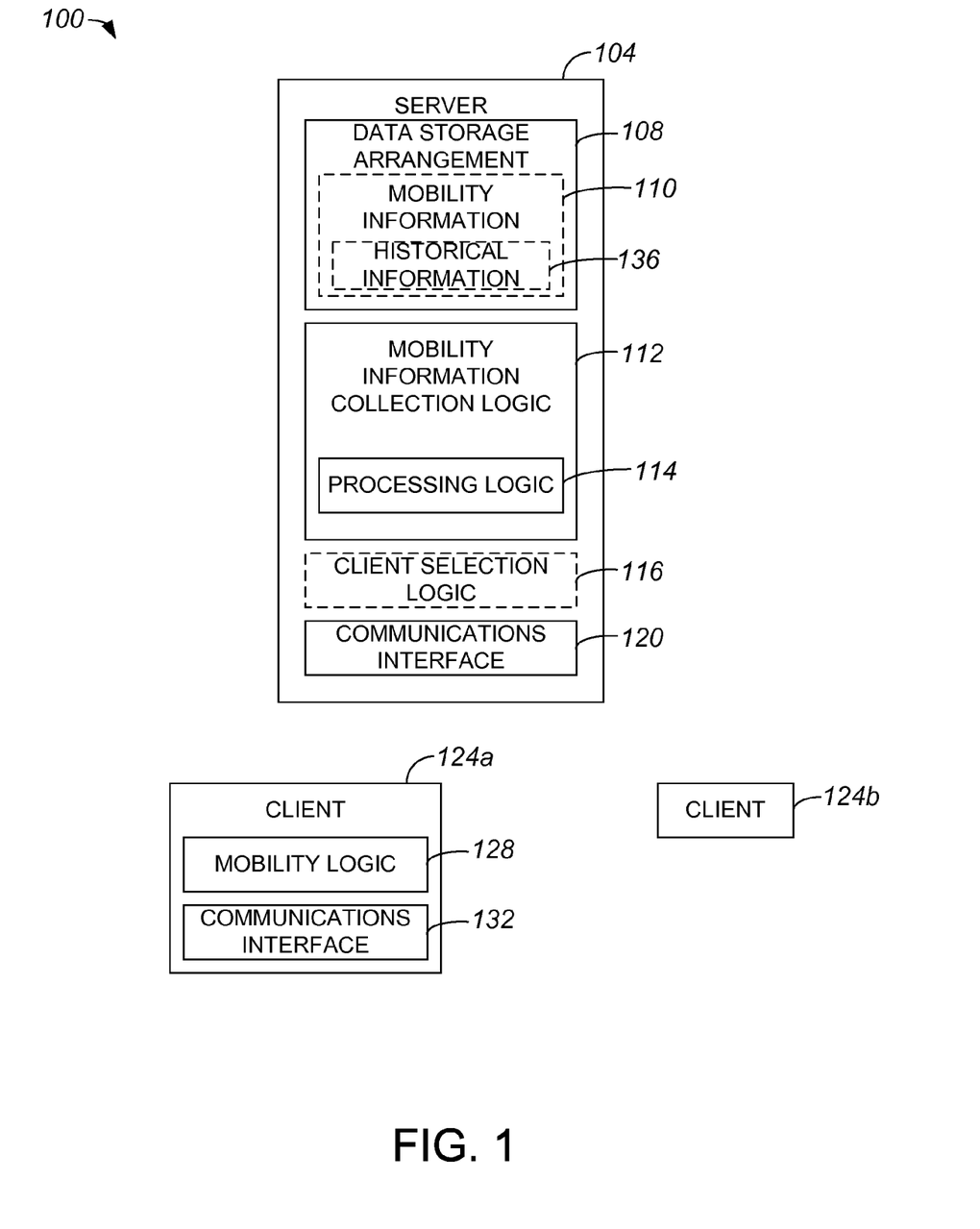
FIG. 1 is a block diagram representation of a network in which mobility information of a client is intelligently used by a server in accordance with an embodiment of the present invention.

Referring initially to FIG. 1, a network in which mobility information of a client is intelligently used by a server will be described in accordance with an embodiment of the present invention. A network 100 may generally enable a server 104 and a plurality of clients 124a, 124b to communicate. The communications between server 104 and plurality of clients 124a, 124b may generally be wireless communications, as clients 124a, 124b may be remote with respect to server 104.

Server 104 and clients 124a, 124b may be associated with a variety of different systems. For example, server 104 may be associated with a call or contact center system, or server 104 may be associated with a voicemail and/or an email system. If server 104 is associated with a contact center system, clients 124a, 124b may be agents of the contact center system. If server 104 is associated with a voicemail and/or an email system, clients 124a, 124b may be subscribers to a voicemail and/or email service that "dial into" or otherwise connect with the server 104 to retrieve voicemail and/or email.

Server 104 includes a data storage arrangement 108 configured to store information associated with clients 124a, 124b. Such information may store mobility information 110. Mobility information 110 may include information relating to locations traversed by clients 124a, 124b and the speeds at which clients 124a, 124b have moved. In one embodiment, mobility information 110 may includes historical mobility information 136. Data storage arrangement 108 also generally stores information used by server 104 to operate. Such information may include, but is not limited to including, profiles (not shown) associated with clients 124a, 124b, and information used by server 104 to interact with clients 124a, 124b.

Server 104 also includes mobility information collection logic 112 which allows server 104 to obtain mobility information from clients 124a, 124b. Mobility information collection logic 112 may poll clients 124a, 124b to obtain mobility information. Clients 124a, 124b may be polled periodically to obtain mobility information, or clients 124a, 124b may be polled on a transactional basis, e.g., when an event occurs for which mobility information is desired, to obtain mobility information. Alternatively, mobility information collection logic 112 may receive or otherwise obtain mobility information that is effectively unsolicited. That is, mobility information collection logic 112 may obtain mobility information that is provided by clients 124a, 124b without essentially being requested by server 104.

Mobility information collection logic 112 may include processing logic 114 which processes mobility information to identify whether clients 124a, 124b are moving and, if appropriate, to estimate a speed at which each client 124a, 124b is moving. Processing logic 114 may generally be associated with a processor. In one embodiment, mobility information collection logic 112 may implement algorithms which process mobility information to effectively determine whether the mobility information indicates that a client 124a, 124b is moving and to estimate speeds at which clients 124a, 124b are moving.

Client selection logic 116 is optionally included in server 104. In one embodiment, when server 104 may be accessed by customers (not shown) to request service, client selection logic 116 may be configured to identify a suitable client 124a, 124b to provide the requested service. Client selection logic 116 may take into account the mobility of clients 124a, 124b in identifying a suitable client 124a, 124b to provide the requested service.

Server 104 also includes a communications interface 120 which may include, but is not limited to including, input and output ports which allow server 104 to communicate with clients 124a, 124b. Communications interface 120 may be arranged to support wireless communications and/or wired communications.

Client 124a includes mobility logic 128 and a communications interface 132. In one embodiment, client 124a may include a mobile device in which mobility logic 128 and communications interface 132 are embodied. Mobility logic 128 is configured to allow the mobility of client 124a to be tracked, and to determine when to provide mobility information to server 104. Mobility logic 128 may incorporate, but is not limited to incorporating, GPS logic, triangulation logic, and/or accelerometer logic to allow the motion of client 124a to be determined. In general, mobility logic 128 may include processing logic.

Figure 2:
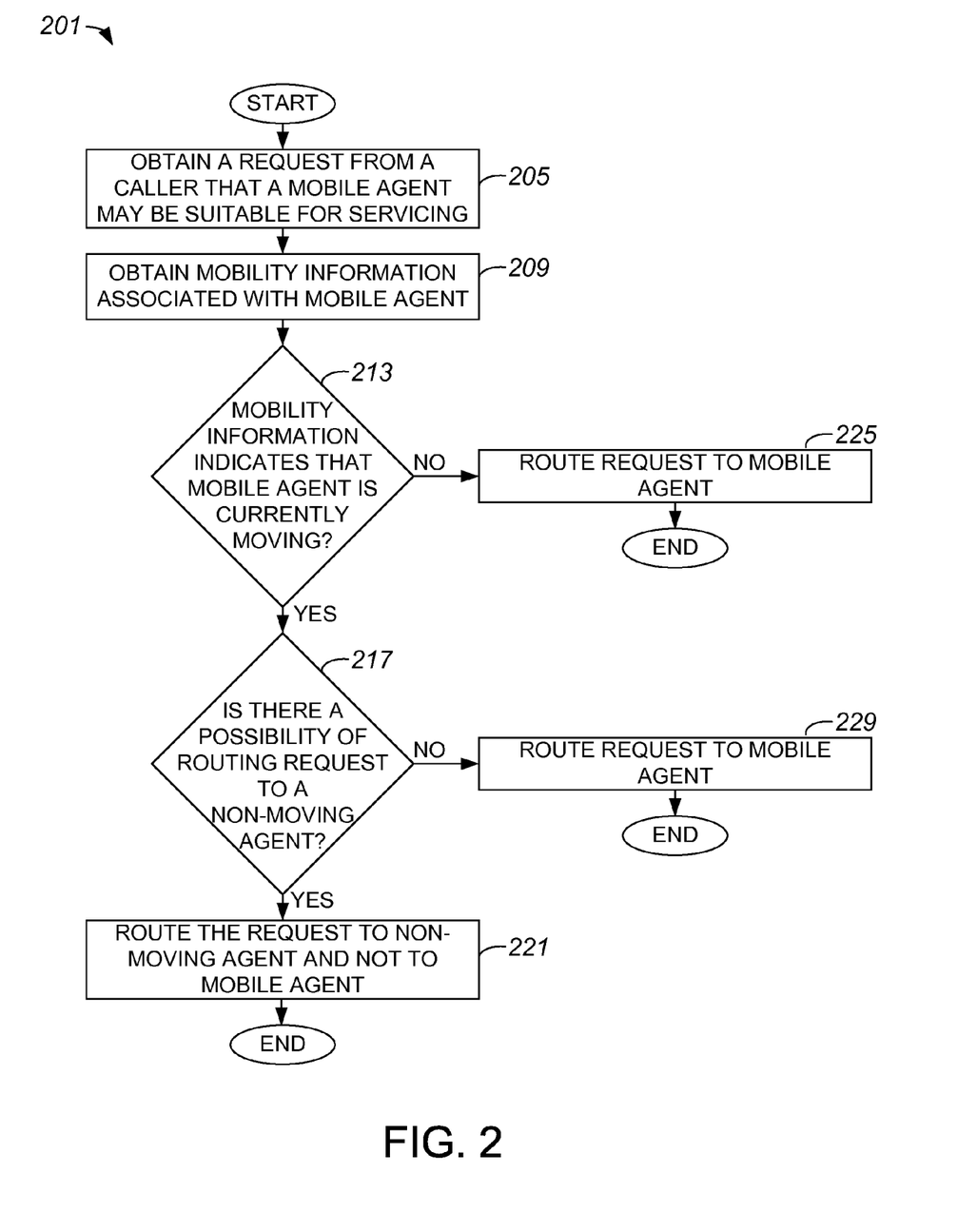
FIG. 2 is a process flow diagram which illustrates a first method of using mobility information to classify an agent, e.g., a mobile agent, in a call or contact center system in accordance with an embodiment of the present invention.

Server 104 and clients 124a, 124b may be a part of an overall contact center system. For example, server 104 may be a call center server, and client 124a may be a mobile agent, or an agent which has the capacity to move. In one embodiment, a mobile agent may be substantially classified as either being mobile or immobile, as for example moving or substantially stationary. A routing rule or rule for routing requests fielded by a contact center may be such that substantially non-moving agents receive preference for servicing requests over moving agents. With reference to FIG. 2, a method of using mobility information to classify a mobile agent associated with a call or contact center system will be described in accordance with an embodiment of the present invention. A process 201 of using mobility information to classify a mobile agent begins at step 205 in which a request for service is obtained from a caller by a call or contact center. The request is identified as possibly being suitable for servicing by the mobile agent. That is, the request is one that the mobile agent is identified as generally being capable of servicing. It should be appreciated that a mobile agent is not necessarily moving, although the mobile agent generally has the capacity to move whether the mobile agent is currently moving or not moving. In other words, a mobile agent has the ability to move, although the mobile agent may be substantially stationary at sometimes, and is not necessarily moving.

Once a request that the mobile agent may be suitable for servicing is obtained, mobility information associated with the mobile agent is obtained by the contact center system in step 209. The mobility information may include substantially any information which may be used to determine whether the mobile agent is moving or stationary. The mobility information may include, but is not limited to including, location information, speed information, and/or acceleration information pertaining to the mobile agent. Locations of the mobile agent may be obtained at different times such that the speed at which the mobile agent is moving may be determined.

Mobility information may be transmitted periodically by the mobile agent and stored with respect to the contact center system. Hence, the contact center system may obtain such information from a data store. It should be appreciated, however, that the contact center system may instead poll the mobile agent to obtain the mobility information. The mobile agent may be polled to obtain the mobility information when there is a need for the mobility information.

A determination is made in step 213 as to whether the mobility information indicates that the mobile agent is currently moving. Such a determination may be based on whether the mobility information indicates that the speed at which the mobile agent is moving is more than a threshold value. If the determination is that the mobile agent is not currently moving, the implication is that the mobile agent is substantially stationary. As such, the request is routed to the mobile agent in step 225, and the process of using mobility information to classify an agent is completed.

Alternatively, if the determination in step 213 is that the mobile agent is currently moving, then it is determined in step 217 whether there is a possibility of routing the request to a different agent, e.g., a non-moving agent. In one embodiment, routing a request to a non-moving agent is preferred over routing the request to a moving agent. If it is determined in step 217 that there is not a possibility of routing the request to a non-moving agent, the indication is that there are effectively no available non-moving agents. Hence, in step 229, the request is routed to the mobile agent, and the process of using mobility information to classify an agent is completed.

If, however, it is determined in step 217 that there is a possibility of routing the request to a different agent, then the request is routed to the non-moving agent and not to the mobile agent in step 221. After the request is routed to the non-moving agent, the process of using mobility information to classify an agent is completed.

Figure 3:
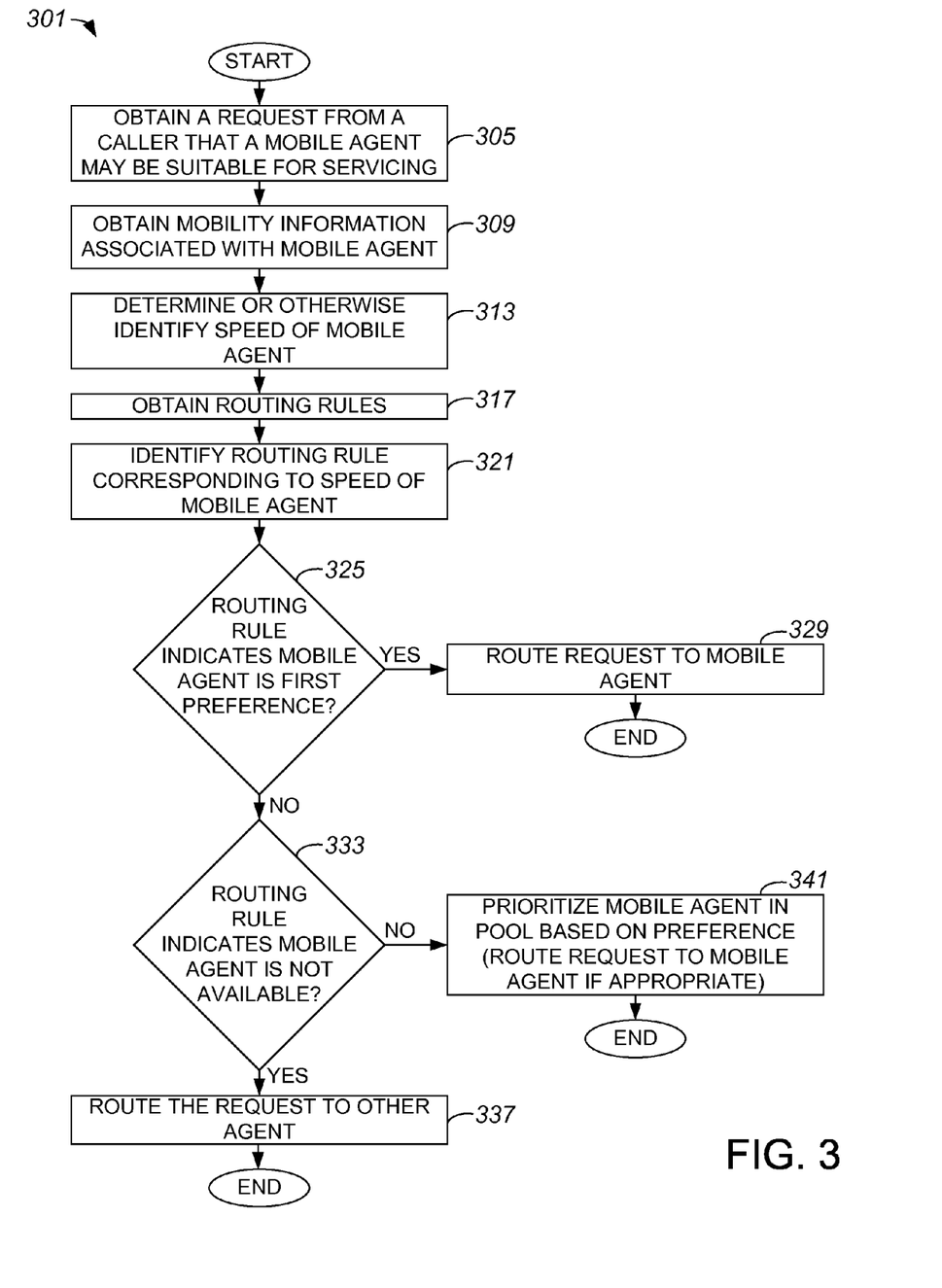
FIG. 3 is a process flow diagram which illustrates a second method of using mobility information to classify an agent, e.g., a mobile agent, in a call or contact center system in accordance with an embodiment of the present invention.

A routing rule used by a contact center system may be such that the actual speed of a mobile agent may be used to determine a preference of the contact center system for routing a request to the mobile agent. In other words, a determination of whether to route a request to a mobile agent may be impacted by the speed at which the mobile agent is estimated as moving. A contact center system may generally implement a set of routing profiles which account for the speed of mobile agents. FIG. 3 is a process flow diagram which illustrates a method of using mobility information to classify a mobile agent, based at least in a call or contact center system based at least in part upon a speed of the agent in accordance with an embodiment of the present invention. A process 301 of using mobility information to classify a mobile agent begins at step 305 in which a contact center system obtains a request from a caller. The request is generally identified as one that the mobile agent may be suitable for servicing. It should be appreciated that the mobile agent is generally capable of moving, although at any given time, the mobile agent may be substantially stationary and, thus, not moving.

After a request is obtained, mobility information associated with the mobile agent is obtained in step 309. The mobility information may be obtained, e.g., retrieved, from a data store of the contact center system if the contact center system has previously obtained and stored mobility information provided by the mobile agent. In one embodiment, the contact center system may poll the mobile agent to obtain mobility information once the mobile agent is identified as being suitable for servicing the caller.

Once the mobility information is obtained, a speed of the mobile agent is determined or otherwise identified in step 313. The speed may be determined or otherwise estimated, for example, using mobility information relating to the physical location of the mobile agent at various times. Mobility information may be historical and/or relatively current. It should be appreciated that when the mobile agent is not currently moving, the speed of the mobile agent may indicate that the mobile agent is substantially stationary.

In step 317, the contact center system obtains routing rules. The routing rules, which may be created and/or maintained by a system administrator of the contact center system, generally indicate how requests are to be routed to agents of the contact center, and how appropriate agents for different requests may be identified. The routing rules may, in one embodiment, effectively specify routing priorities based on whether agents are moving or substantially stationary. By way of example, a higher routing priority may be assigned to a substantially stationary agent, a lower routing priority may be assigned to an agent that is moving at a relatively slow speed, and a still lower routing priority may be assigned to an agent that is moving at a relatively fast speed. Any number of routing rules may generally be specified to include considerations of the speed of an agent. Such routing rules may include, but are not limited to including, system wide routing rules, e.g., rules applicable to substantially all agents of a contact center system, and/or specific routing rules, e.g., rules applicable substantially only to the mobile agent.

Upon obtaining the routing rules in step 317, a routing rule that corresponds to the speed of the mobile agent is identified in step 321. For example, if the mobile agent is substantially stationary, the routing rule that corresponds to a stationary mobile agent may be identified. Once the appropriate routing rule is identified, it is determined in step 325 whether the identified routing rule indicates that the mobile agent is a first preference. That is, it is determined whether the identified routing rule specifies that the mobile agent is a preferred agent for servicing the request obtained in step 305. In one embodiment, the mobile agent may be the preferred agent if the mobile agent has a speed of approximately zero miles per hour, or is otherwise considered to be substantially stationary. If the determination is that the routing rule indicates that the mobile agent is a first preference for servicing the request, the request is routed to the mobile agent in step 329, and the process of using mobility information to classify a mobile agent is completed.

Alternatively, if it is determined in step 325 that the identified routing rule does not indicate that the mobile agent is a first preference, then process flow proceeds to step 333 in which it is determined whether the identified routing rule indicates that the mobile agent is not available to service a request. A mobile agent may essentially be identified as being unavailable for any suitable reason. By way of example, a mobile agent may be identified as being unavailable if the speed of the mobile agent indicates that the mobile agent is moving at a speed consistent with running or jogging. However, it should be appreciated that relatively fast speeds which correspond to a mobile agent that may be in a moving vehicle may not cause the mobile agent to be identified as unavailable, as a user associated with the mobile agent may be able to service a request if he or she is sitting in the moving vehicle.

If it is determined in step 333 that the routing rule does not indicate that the mobile agent is unavailable, then the implication is that the request may be routed to the mobile agent. Accordingly, in step 341, the mobile agent is prioritized in a pool of agents based on the preference associated with the routing rule, and the request is routed to the mobile agent if appropriate. In one embodiment, the mobile agent may effectively receive the request if no other agent with a preference that is higher than that of the mobile agent is available. The process of classifying a mobile agent using mobility information is completed upon prioritizing the mobile agent.

Alternatively, if it is determined in step 333 that the identified routing rule indicates that the mobile agent is unavailable, then the request is routed to another agent in step 337. After the request is routed, the process of using mobility information to classify a mobile agent is completed.

Figure 4:
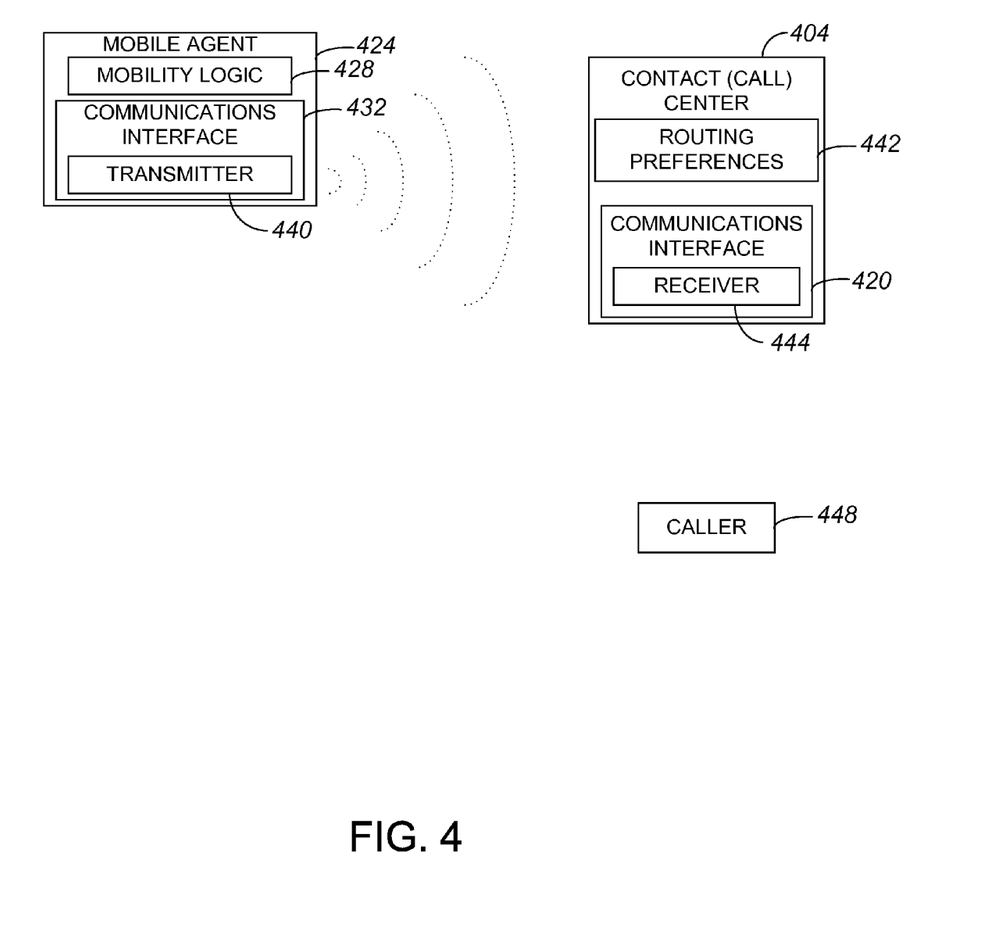
FIG. 4 is a diagrammatic representation of a system in which a mobile agent provides mobility information to a contact center in accordance with an embodiment of the present invention.

FIG. 4 is a diagrammatic representation of a system in which a mobile agent provides mobility information to a contact center in accordance with an embodiment of the present invention. A mobile agent 424, which may be embodied to include substantially any communications device that is capable of communicating with a contact center 404, includes mobility logic 428 that allows the mobility of mobile agent 424 to effectively be tracked. Mobile agent 424 may include, but is not limited to including, a mobile or cellular telephone, and/or a computing system such as a laptop computer. In one embodiment, mobility logic 428 may be associated with a GPS system and/or an accelerometer.

Mobility agent 424 also includes a communications interface 432 that is configured to allow mobile agent 424 to communicate with contact center 404 and with a caller 488 who has called into contact center 404. Communications interface 432 may include a transmitter 440 that allows mobile agent 424 to transmit, e.g., in a wireless manner, mobility information to contact center 404. Transmitter 440 may be associated with a GPS transmitter if GPS technology is used to pinpoint the location of mobile agent 424 at any point in time.

Contact center 404 may receive a call or, more generally, a communication from caller 448 through a receiver 444 that is a part of communications interface 432. When contact center 404 receives a call from caller 448, contact center 404 may ascertain that caller 448 has requested service.

Upon determining that caller 448 has requested service, contact center 404 may access routing preferences 442 to determine how to route the call. For example, contact center 404 may use routing preferences 442 to identify mobile agent 424 as being capable of providing service to caller 448. In the described embodiment, routing preferences 442 include preferences which consider the speed at which mobile agent 424 is moving. Mobility information relating to mobile agent 424 may be obtained from mobile agent 424 in response to the call from caller 448 when routing preferences 442 effectively identify mobile agent 424 as potentially suitable for servicing the call. Alternatively, if contact center 404 substantially collects mobility information from mobile agent 424, contact center 404 may access the collected mobility information when mobile agent 424 is identified as potentially being suitable for servicing the call.

Figure 5:
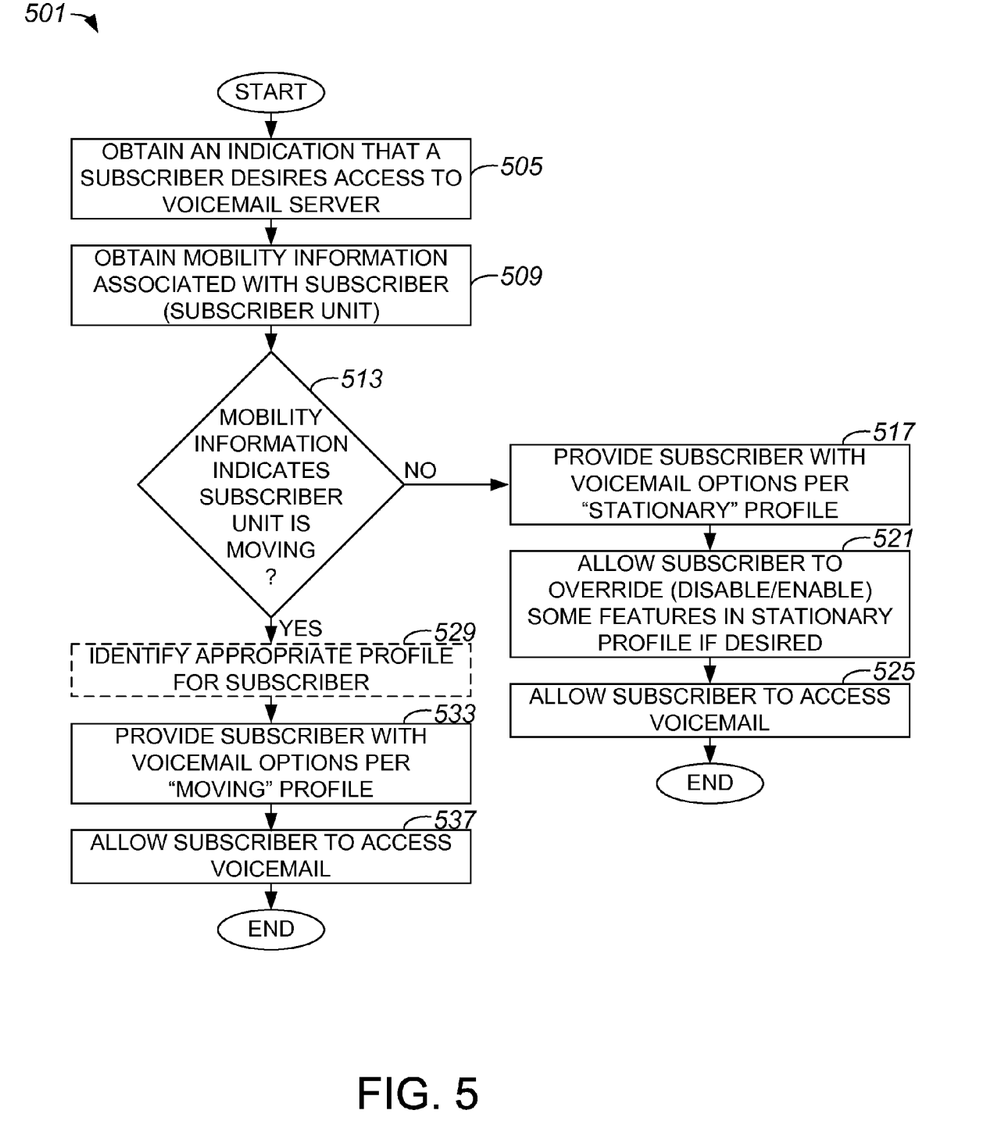
FIG. 5 is a process flow diagram which illustrates a method of using mobility information to determine voicemail options in accordance with an embodiment of the present invention.

As previously mentioned, mobility information is not limited to being used with respect to a contact center. By way of example, mobility information may be used by a voicemail system and/or a unified messaging system to provide options relating to accessing a voicemail box. Referring next to FIG. 5, one process of using mobility information to determine voicemail options in accordance will be described in accordance with an embodiment of the present invention. A process 501 of using mobility information to determine voicemail options begins at step 505 in which a voicemail system obtains an indication that a subscriber desires access to a voicemail server. Such an indication may be obtained, for instance, when the voicemail system identifies that the subscriber has accessed a menu interface which would allow the subscriber to access a voicemail box associated with the subscriber. Typically, the subscriber is associated with a subscriber unit, e.g., a cell phone, from which the indication that the subscriber desires access to the voicemail server is obtained.

In step 509, mobility information associated with the subscriber is obtained. The mobility information may, in one embodiment, be included with the indication that the subscriber desire access to the voicemail server. For example, when a subscriber dials into or otherwise access the voicemail server, mobility information may be provided. It should be appreciated, however, that a voicemail system may instead or additionally obtain mobility information by requesting the mobility information from the subscriber unit.

Once the mobility information associated with the subscriber is obtained, a determination is made in step 513 as to whether the mobility information indicates that the subscriber unit is moving. If the determination in step 513 is that the subscriber unit is likely moving, then the implication is that that a "moving" voicemail profile is to be selected. A voicemail system includes a plurality of voicemail profiles that may be selected for use by the system based upon factors such as the mobility of the subscriber. Voicemail profiles may specify, but are not limited to specifying, whether menu interfaces are voice-activated and whether a TTS conversion option is to be substantially automatically implemented with respect to presenting the subscriber with email. In one embodiment, voicemail profiles may be dependent upon the speed at which a subscriber unit is moving. By way of example, a "stationary" voicemail profile may be associated with a substantially non-moving subscriber unit, a "slow moving" voicemail profile may be associated with a moving subscriber that is moving at a relatively low speed, and a "fast moving" voicemail profile may be associated with a moving subscriber that is moving at a relatively fast speed.

If the subscriber unit is determined to likely be moving in step 513, an appropriate moving voicemail profile is optionally identified in step 529 if there is more than one moving voicemail profile. In step 533, the subscriber is provided with voicemail options as specified in the appropriate moving voicemail profile. After the subscriber is provided with voicemail options as specified in the appropriate moving voicemail profile, the subscriber is allowed to access voicemail in step 537. Once the subscriber is allowed to access voicemail, the process of using mobility information to determine voicemail options is completed.

Returning to step 513 and the determination of whether the mobility information indicates that the subscriber unit is moving, if it is determined that the subscriber unit is likely not moving, then process flow moves to step 517 in which the voicemail system provides the subscriber with voicemail options as specified in a stationary voicemail profile. In one embodiment, a stationary voicemail profile may provide key-based menu options, and may not substantially automatically offer a menu option which implements TTS conversion to playout email. Once the subscriber is provided with voicemail options specified by a stationary voicemail profile, the voicemail system allows the subscriber to override some features in the stationary voicemail profile, if desired, in step 521. The subscriber may effectively enable and disable voicemail settings. For example, a subscriber may enter key strokes into a key pad to enable a TTS conversion options in order to present email in a speech context. After the subscriber is allowed to override some features in the stationary profile, the subscriber is allowed to access voicemail in step 525, and the process of using mobility information to determine voicemail options is completed.

Figure 6:
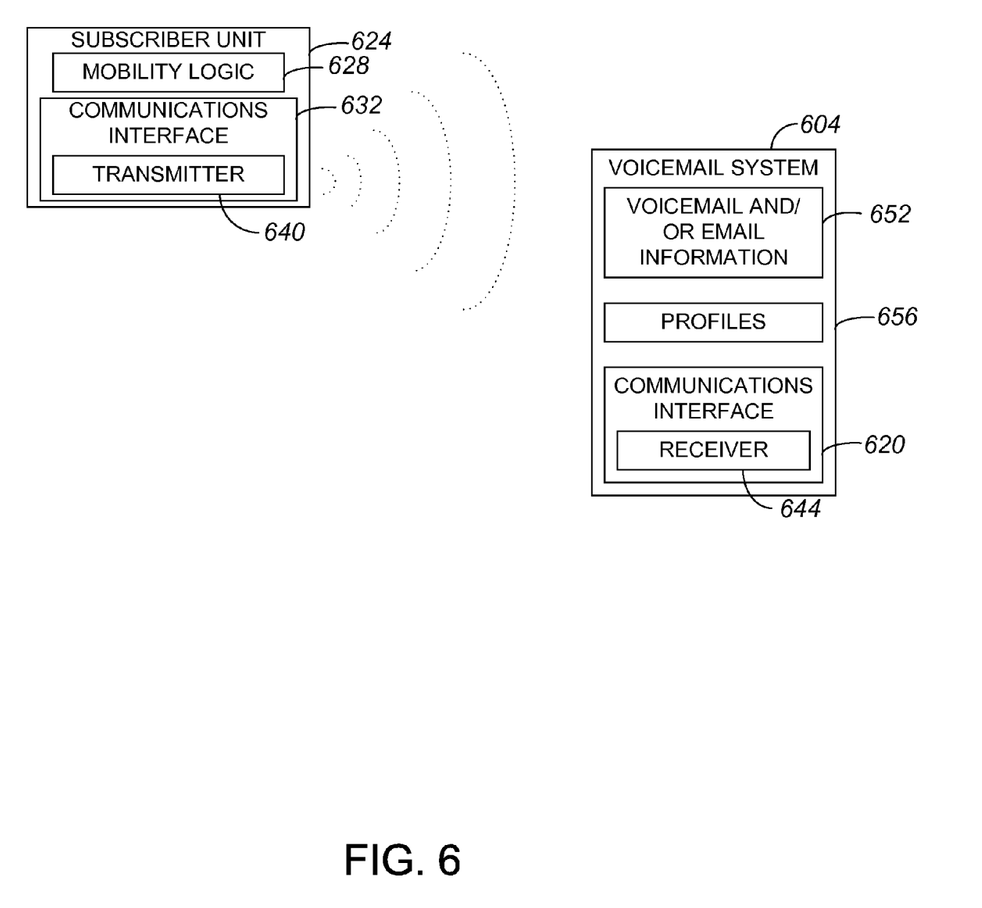
FIG. 6 is a diagrammatic representation of a system in which a subscriber unit provides mobility information to a voicemail system that may be associated with a contact center in accordance with an embodiment of the present invention.

FIG. 6 is a diagrammatic representation of a system in which a subscriber unit provides mobility information to a contact center in accordance with an embodiment of the present invention. A subscriber unit 624, which may be embodied as substantially any communications device that may communicate with a voicemail system 604, includes mobility logic 628 that allows the mobility of subscriber unit 624 to effectively be tracked. Subscriber unit 624 may be, but is not limited to being, a mobile or cellular telephone, and/or a computing system such as a laptop computer. Mobility logic 628 may generally include hardware and/or software logic associated with a GPS system and/or an accelerometer.

Subscriber unit 624 additionally includes a communications interface 632 that is configured to allow subscriber unit 624 to communicate with voicemail system 604. Communications interface 632 may include a transmitter 640 that allows subscriber unit 624 to transmit or otherwise provide mobility information to voicemail system 604.

When a subscriber wishes to access voicemail and/or email information 652 stored on voicemail system 604, e.g., in a voicemail server, subscriber may call into voicemail system through a communications interface 620 with a receiver 644. Upon determining that subscriber unit 624 has effectively requested access to voicemail and/or email information 652, voicemail system 604 may access profiles 656 to identify a suitable profile for use in providing voicemail options to subscriber unit 624. In one embodiment, voicemail system 604 uses mobility information transmitted from subscriber unit 624 to identify a suitable profile. In the described embodiment, profiles 656 consider the speed at which subscribe unit 624 is moving. That is, a suitable profile 656 is selected by voicemail system 604 based on the speed at which subscriber unit 624 is moving.

Although only a few embodiments of the present invention have been described, it should be understood that the present invention may be embodied in many other specific forms without departing from the spirit or the scope of the present invention. By way of example, while the use of mobility information to select voicemail profiles has been described, the use of mobility information may also generally be used to select profiles with respect to profiles used in unified messaging systems.

While routing profiles and voicemail profiles have generally been described as being stored on a server, e.g., a server associated with a contact center system or a voicemail system, the profiles may instead be stored on mobile devices. In other words, routing profiles may be stored on a device associated with a mobile agent and voicemail profiles may be stored on a subscriber unit. Alternatively, routing profiles and voicemail profiles may be stored in a distributed fashion throughout a network or overall system.

Routing profiles and voicemail profiles which account for mobility information may be system-wide and/or individualized. That is, profiles may apply to substantially all agents of a contact center system or to substantially all subscribers to a voicemail system. It should be appreciated, however, that profiles may instead by customized such that a particular user may customize his or her profile to reflect his or her preferences. A mobile agent may be allowed to configure personalized routing preferences based on speed and other mobility information. For instance, a mobile agent may decide not to service calls unless the mobile agent is substantially stationary, even if the "default" setting for a contact system is such that relatively slow moving mobile agents are added to a pool of agents available to service a call.

The amount of mobility information used to determine whether a mobile agent is moving, as well as an estimated speed of the mobile agent, may vary widely. Information corresponding to two different times may be sufficient to determine whether a mobile agent is moving, and to determine what an estimated speed of a moving mobile agent may be. However, as a mobile agent may generally be moving but temporarily stopped, using information corresponding to more than two different times may be used in ascertaining whether the mobile agent is moving and, if the mobile agent is moving, in identifying the estimated speed of the mobile agent. For instance, as a mobile agent in a moving car may be temporarily stopped at a traffic light, using mobility information from more than two different times may allow for a determination that the mobile agent is generally moving.

Voicemail notifications may be arranged to be modified based on whether or not a mobile agent or subscriber is in motion. For example, a user may configure his or her voicemail system to call a particular cell phone whenever a new voicemail message is received in his or her voicemail inbox, and/or may configure his or her voicemail system to send an SMS text message notification to a cell phone when a new voicemail message is received. However, a rule may be set with respect to the voicemail system that instructs a voicemail server not call the cell phone when the user is in motion and/or not to send an SMS text message while the user is in motion. Substantially preventing a voicemail system from calling or otherwise notifying a subscriber while the subscriber is in motion may prevent the subscriber from being interrupted when the subscriber is not likely to wish to be interrupted, e.g., while driving a car. In a voicemail notification scheme, a voicemail system may query a device to determine if the user of the device is in motion, and then determine whether a notification is to be sent based on the rules set regarding voicemail notification.

In one embodiment, a relatively recent history of a moving speed for a mobile agent or a subscriber may be maintained and utilized when a call is to be routed or voicemail is to be accessed, respectively. By way of example, if a first mobile agent has been moving between approximately zero miles per hour and approximately twenty miles an hour for a period of time, and a second mobile agent has been moving at approximately zero miles per hour during the same period of time, a call may be routed to the second mobile agent rather than the first mobile agent, as the second mobile agent is more likely to be substantially stationary.

The time intervals at which mobility information is obtained may vary. Mobility information may be obtained relatively frequently, as for example more than once per second for a predetermined amount of time. Alternatively, mobility information may be obtained less frequently, as for example less than once per second for a predetermined amount of time. The predetermined amount of time may be any suitable amount of time.

Mobile agents and subscriber units may be associated with a variety of different mobile devices. Mobile devices generally include, but are not limited to including, cellular phones, personal digital assistants (PDAs), and/or portable computers. By way of example, a mobile device may be a vehicle which includes a built-in phone or computing system.

In one embodiment, information relating to whether a mobile agent is moving or not moving may be used to determine how long the mobile agent has to answer an incoming call once the incoming call is routed to the mobile agent. For instance, a mobile agent that is mobile may be allowed more "rings" before the incoming call is rerouted to a different agent.

The present invention may be implemented as hardware and/or software logic embodied in a tangible medium that, when executed, is operable to perform the various methods and processes described above. The software logic may include computer code or computer-readable program devices embodied on a tangible medium that is a computer-readable medium. A computer-readable medium, e.g., a computer memory or a memory device, and computer code embodied on the computer-readable medium may form a computer program product. Logic may generally be implemented as hardware logic, software logic, or a combination of both hardware and software logic. In one embodiment, such logic may be configured as an application on a client and/or a server. As will be appreciated by those skilled in the art, software logic such as computer code may be executed by a processor, e.g., a processor associated with a server or a client.

The steps associated with the methods of the present invention may vary widely. Steps may be added, removed, altered, combined, and reordered without departing from the spirit of the scope of the present invention. Therefore, the present examples are to be considered as illustrative and not restrictive, and are not to be limited to the details given herein, but may be modified within the scope of the appended claims.

What is claimed is:

1. A method comprising:
   obtaining mobility information associated with a first remote device, the mobility information being arranged to indicate whether the first remote device is approximately stationary, the first remote device being arranged to interact with a server, wherein the first remote device is associated with a first mobile agent;
   determining if the mobility information indicates that the first remote device is approximately stationary;
   selecting a first profile of a plurality of profiles if it is determined that the first remote device is approximately stationary;
   obtaining a request for service from a caller to the server;
   identifying the first mobile agent as being capable of servicing the request;
   routing the request to the remote device if it is determined that the first remote device is approximately stationary as specified in the first profile;
   selecting a second profile of the plurality of profiles if it is determined that the first remote device is not approximately stationary;
   preventing the request from being routed to the first remote device if it is determine that the first remote device is not approximately stationary; and
   routing the request to a second remote device if it is determined that the first remote device is not approximately stationary, the second remote device being associated with a second mobile agent.

2. The method of claim 1 wherein the server is included in a contact center, and wherein
   obtaining the request for service from the server includes obtaining the request for service from the caller to the contact center.

3. The method of claim 2 wherein the plurality of profiles includes a third profile, the method further including:
   determining a speed of the first remote device if it is determined that the first remote device is not approximately stationary, wherein selecting the second profile includes selecting the second profile if the speed of the first remote device is determined to be within a first range of speeds.

4. The method of claim 3 further including:
   selecting the third profile if it is determined that the first remote device is not approximately stationary and the speed of the first remote device is determined to be within a second range of speeds, the second range of speeds being higher than a first range of speeds.

5. The method of claim 4 wherein the second profile and the third profile are arranged to specify a routing priority associated with the first remote device.

6. The method of claim 1 wherein the first remote device is associated with a subscriber to a messaging system and the server is associated with the messaging system, wherein obtaining the request for service form the caller to the server includes
   obtaining a request to access the messaging system.

7. The method of claim 6 wherein the plurality of profiles includes a third profile, the method further including:
   determining a speed of the first remote device if it is determined that the remote device is not approximately stationary, wherein selecting the second profile includes selecting the second profile if the speed of the remote device is determined to be within a first range of speeds; and
   selecting the third profile if it is determined that the remote device is not approximately stationary and if the speed of the remote device is not within the first range of speeds.

8. The method of claim 6 wherein the request and the mobility information are obtained at approximately the same time.

9. The method of claim 6 wherein the messaging system is a voicemail system.

10. The method of claim 9 wherein the remote device includes a keypad and the plurality of profiles are voicemail profiles, and wherein the first profile allows a voicemail associated with the first remote device to be accessed using the keypad and the second profile allows the voicemail associated with the first remote device to be accessed but prevents the voicemail associated with the first remote device from being accessed using the keypad.

11. The method of claim 1 wherein the server is associated with a contact center system and the first remote device is associated with the first mobile agent of the contact center system, and wherein the first profile indicates that the first remote device is available to service a request and the second profile indicates that the first remote device is not available to service the request.

12. An apparatus comprising:
   means for obtaining mobility information associated with a first remote device, the mobility information being arranged to indicate whether the first remote device is approximately stationary, the first remote device being arranged to interact with a server, wherein the first remote device is associated with a first mobile agent;
   means for determining if the mobility information indicates that the first remote device is approximately stationary;
   means for selecting a first profile of a plurality of profiles if it is determined that the first remote device is approximately stationary;
   means for obtaining a request for service from a caller to the server;
   means for identifying the first mobile agent as being capable of servicing the request;

means for routing the request to the remote device if it is determined that the first remote device is approximately stationary as specified in the first profile;

means for selecting a second profile of the plurality of profiles if it is determined that the remote device is not approximately stationary;

means for preventing the request from being routed to the first remote device if it is determine that the first remote device is not approximately stationary; and means for routing the request to a second remote device if it is determined that the first remote device is not approximately stationary, the second remote device being associated with a second mobile agent.

13. A non-transitory computer-readable medium including computer code that is operable to:

obtain mobility information associated with a first remote device, the mobility information being arranged to indicate whether the first remote device is approximately stationary, the first remote device being arranged to interact with a server, wherein the first remote device is associated with a first mobile agent;

determine if the mobility information indicates that the first remote device is approximately stationary;

select a first profile of a plurality of profiles if it is determined that the first remote device is approximately stationary;

obtain a request for service from a caller to the server;

identify the first mobile agent as being capable of servicing the request;

route the request to the remote device if it is determined that the first remote device is approximately stationary as specified in the first profile;

select a second profile of the plurality of profiles if it is determined that the first remote device is not approximately stationary;

prevent the request from being routed to the first remote device if it is determine that the first remote device is not approximately stationary; and route the request to a second remote device if it is determined that the first remote device is not approximately stationary, the second remote device being associated with a second mobile agent.

14. The computer-readable medium of claim 13 wherein the server is included in the contact center, and wherein the computer code operable to obtain the request for service from the server is further operable to obtain the request for service from the caller to the contact center.

15. The computer-readable medium of claim 14 wherein if it is determined that the first remote device is not approximately stationary, the computer code is further operable to:

prevent the request from being routed to the first remote device if it is determined that the remote device is not approximately stationary.

16. The computer-readable medium of claim 14 wherein the plurality of profiles includes a third profile, the computer code further operable to:

determine a speed of the first remote device if it is determined that the remote device is not approximately stationary, wherein the logic operable to select the second profile is further operable to select the second profile if the first speed of the remote device is determined to be within a first range of speeds.

17. The computer-readable medium of claim 16 wherein the computer code is further operable to:

select the third profile if it is determined that the first remote device is not approximately stationary and the speed of the remote device is determined to be within a second range of speeds, the second range of speeds being higher than a first range of speeds.

18. The computer-readable medium of claim 17 wherein the second profile and the third profile are arranged to specify a routing priority associated with the first remote device.

19. The computer-readable medium of claim 13 wherein the first remote device is associated with a subscriber to a messaging system and the server is associated with the messaging system, the computer code further being operable to:

obtain a request to access the messaging system.

20. The computer-readable medium of claim 19 wherein the plurality of profiles includes a third profile, the computer code further being operable to:

determine a speed of the first remote device if it is determined that the first remote device is not approximately stationary, wherein the logic operable to select the second profile is further operable to select the second profile if the speed of the first remote device is determined to be within a first range of speeds.

21. The computer-readable medium of claim 19 wherein the request and the mobility information are obtained at approximately the same time.

22. The computer-readable medium of claim 19 wherein the messaging system is a voicemail system, and wherein the first remote device includes a keypad and the plurality of profiles are voicemail profiles, the first profile being arranged to allow a voicemail associated with the first remote device to be accessed using the keypad, the second profile being arranged to allow the voicemail associated with the first remote device to be accessed while preventing the voicemail associated with the first remote device from being accessed using the keypad.

23. An apparatus, the apparatus being one selected from the group including a contact center server and a voicemail server, the apparatus comprising:

a communications interface, the communications interface being arranged to obtain mobility information from a first remote device and a request for service from a caller, the mobility information being arranged to indicate an estimate of a speed at which the remote device is moving, wherein the mobility information includes a location of the remote device, a speed of the remote device, and an acceleration of the remote device; and wherein the first remote device is associated with a first mobile agent, the mobility information being arranged to indicate whether the first remote device is approximately stationary a data storage arrangement for storing the mobility information;

a processing arrangement, the processing arrangement including a mobility information collecting logic arranged to interface with the data storage and the communication interface, the processing arrangement being configured to process the mobility information to identify a first profile of a plurality of profiles to implement with respect to the first remote device, wherein the first profile is identified based in part on whether the mobility information indicates that the remote device is approximately stationary, the processing arrangement further being configured to select a second profile of the plurality of profiles if it is determined that the first remote device is not approximately stationary, to prevent the request from being routed to the first remote device if it is determined that the first remote device is not approximately stationary, and to route the request to a second remote device if it is determined that the first remote device is not approximately stationary;

the second remote device being associated with a second mobile agent.

24. The apparatus of claim 23 wherein the processing arrangement is further configured to implement the first profile if the mobility information indicates that the remote device is approximately stationary.

25. The apparatus of claim 24 wherein the processing arrangement is further configured to process the mobility information to identify a second profile of the plurality of profiles and to implement the second profile if the mobility information indicates that the remote device is moving.

26. The apparatus of claim 23 wherein the mobility information includes a location of the remote device, a speed of the remote device, and an acceleration of the remote device, and wherein the apparatus is one selected from the group including a contact center server and a voicemail server.

* * * * *